United States Patent
Takashima et al.

(10) Patent No.: US 10,411,566 B2
(45) Date of Patent: Sep. 10, 2019

(54) MOTOR TEMPERATURE ESTIMATING DEVICE

(71) Applicant: TOYOTA JIDOSHA KABUSHIKI KAISHA, Toyota-shi, Aichi-ken (JP)

(72) Inventors: Toru Takashima, Susono (JP); Yusuke Suetake, Susono (JP); Tetsuya Morino, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 254 days.

(21) Appl. No.: 15/463,043

(22) Filed: Mar. 20, 2017

(65) Prior Publication Data
US 2017/0307448 A1 Oct. 26, 2017

(30) Foreign Application Priority Data
Apr. 20, 2016 (JP) .................................. 2016-084619

(51) Int. Cl.
*H02K 15/04* (2006.01)
*H02K 11/21* (2016.01)
(Continued)

(52) U.S. Cl.
CPC ............... *H02K 11/21* (2016.01); *G01K 7/42* (2013.01); *G01K 7/427* (2013.01); *H02K 11/25* (2016.01); *G01K 2205/00* (2013.01)

(58) Field of Classification Search
CPC .......... G01K 7/36; G01K 13/08; G01K 13/00; G01K 1/16; G01K 1/08; G01R 19/002;
(Continued)

(56) References Cited

U.S. PATENT DOCUMENTS 3,546,531 A * 12/1970 Miner .................... H02H 3/083
361/103
5,416,728 A * 5/1995 Rudzewicz .............. G01K 1/20
340/449

(Continued)

FOREIGN PATENT DOCUMENTS

JP          11089268 A      3/1999
JP     2003-284375 A     10/2003
(Continued)

*Primary Examiner* — Gail Kaplan Verbitsky
(74) *Attorney, Agent, or Firm* — Sughrue Mion, PLLC

(57) ABSTRACT

In a motor temperature estimating device including: a polyphase motor 1 having a first phase coil, a second phase coil and a third phase coil; current sensors; a determination section that determines whether or not the polyphase motor is rotating; and a transformation section that transforms a first phase output signal from the first phase current sensor, a second phase output signal from the second phase current sensor, and a third phase output signal from the third phase current sensor to output a post-transformation output signal, the post-transformation output signal is inputted to a first temperature estimation section that estimates the temperature of the polyphase motor during rotation, and the first phase output signal, the second phase output signal and the third phase output signal are inputted to a second temperature estimation section that estimates the temperature of the polyphase motor during stop.

7 Claims, 6 Drawing Sheets

(51) Int. Cl.
*H02K 11/25* (2016.01)
*G01K 7/42* (2006.01)

(58) Field of Classification Search
CPC ........ H02K 11/21; H02K 15/04; G01N 21/84; H02P 29/64
See application file for complete search history.

(56) References Cited

U.S. PATENT DOCUMENTS

| | | | |
|---|---|---|---|
| 7,129,660 B2 * | 10/2006 | Fujita | H02P 23/14 318/434 |
| 7,265,954 B2 * | 9/2007 | Hikawa | G01K 7/00 318/471 |
| 8,421,391 B2 * | 4/2013 | Yeh | G01K 7/42 318/400.15 |
| 8,450,962 B2 * | 5/2013 | Wu | H02P 21/0003 318/610 |
| 8,941,348 B2 * | 1/2015 | Mirzaei | H02H 3/253 318/77 |
| 9,849,806 B1 * | 12/2017 | Xu | H02P 27/08 |
| 2005/0242760 A1 | 11/2005 | Fujita et al. | |
| 2007/0182110 A1 | 8/2007 | Urababa | |
| 2009/0030595 A1 * | 1/2009 | Sugai | B60K 6/445 701/112 |
| 2010/0066294 A1 * | 3/2010 | Hendrickson | B60L 3/0023 318/490 |
| 2011/0266992 A1 * | 11/2011 | Nishiguchi | B60L 11/123 318/807 |
| 2013/0123671 A1 * | 5/2013 | Ikeuchi | A61H 3/00 601/35 |
| 2015/0331051 A1 * | 11/2015 | Maki | G01R 31/34 324/765.01 |
| 2016/0308475 A1 * | 10/2016 | Morii | H02P 21/02 |
| 2018/0079311 A1 * | 3/2018 | Ichikawa | B60L 3/00 |

FOREIGN PATENT DOCUMENTS

| | | |
|---|---|---|
| JP | 2005204358 A | 7/2005 |
| JP | 2005263010 A | 9/2005 |
| JP | 2007210454 A | 8/2007 |
| JP | 2010111265 A | 5/2010 |
| JP | 2015-091147 A | 5/2015 |
| WO | WO-2009104791 A1 * | 8/2009 ............ B60T 13/741 |

* cited by examiner

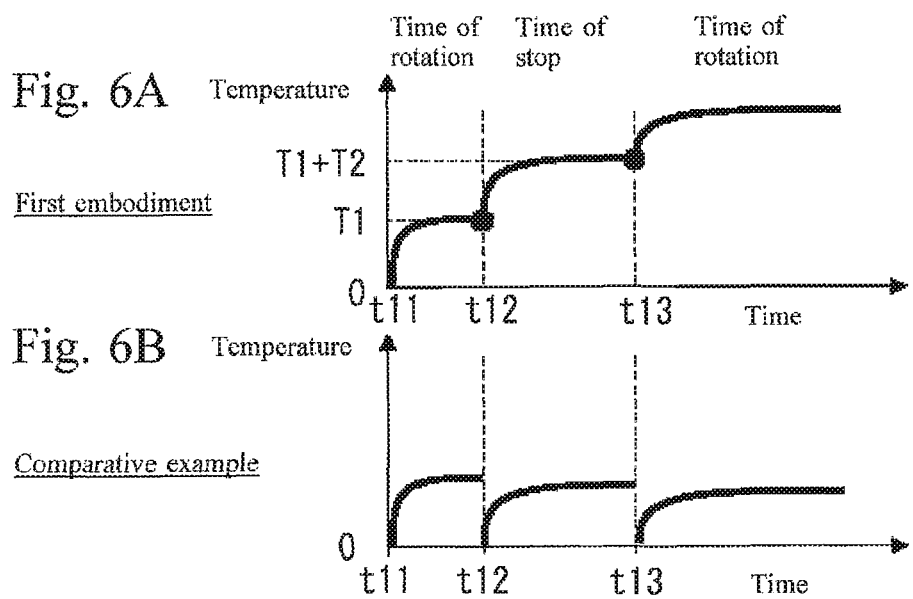
Fig. 6A First embodiment
Fig. 6B Comparative example
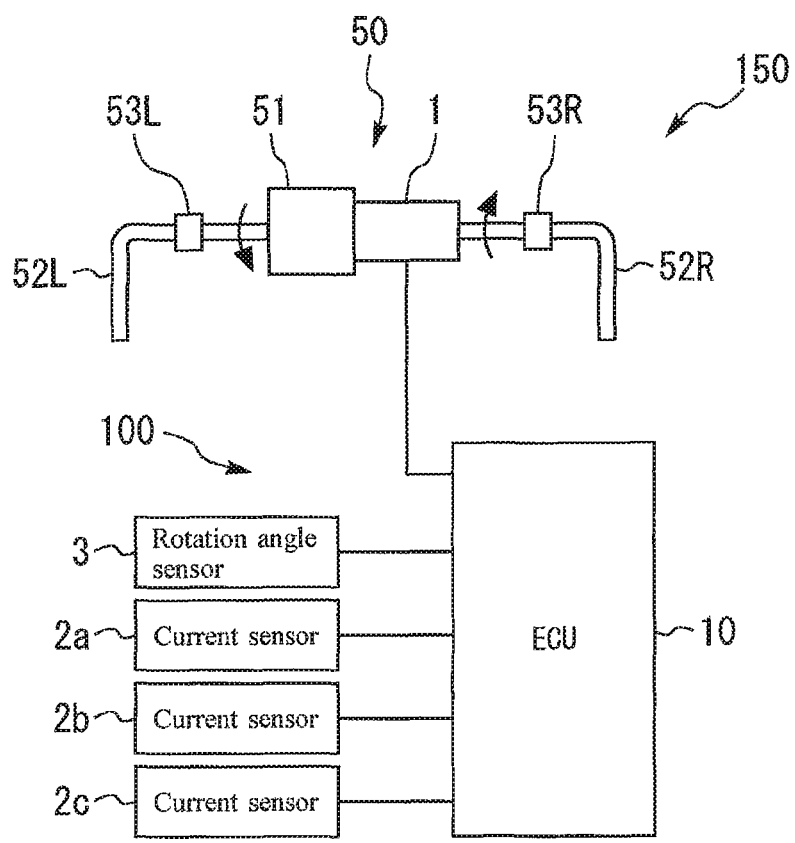
Fig. 7

MOTOR TEMPERATURE ESTIMATING DEVICE

CROSS-REFERENCE TO RELATED APPLICATION

This application is based on and claims the benefit of Japanese Patent Application No. 2016-084619, filed on Apr. 20, 2016, which is incorporated by reference herein in its entirety.

BACKGROUND

Technical Field

The present disclosure relates to a motor temperature estimating device having a polyphase motor current sensors.

Background Art

There is known a motor temperature estimating device having current sensors that detect a current flowing in a U-phase coil, a current flowing in a V-phase coil and a current flowing in a W-phase coil of a three-phase motor. An example of motor temperature estimating devices of this kind is disclosed in JP 2003-284375 A, for example.

In the motor temperature estimating device disclosed in JP 2003-284375 A, transformation from three-phase currents (that is, a current flowing in a U-phase coil, a current flowing in a V-phase coil, and a current flowing in a W-phase coil) into two-phase currents (that is, a D-axis current and a Q-axis current) is carried out. Further, a sum of square values of the two-phase currents (that is, a sum of a square value of the D-axis current and a square value of the Q-axis current) is calculated.

Furthermore, in the motor temperature estimating device disclosed in JP 2003-284375 A, at the time of stopping the three-phase motor, a low-pass filter processing arithmetic operation is carried out, which makes a change of the sum of the square values of the two-phase currents rapider (that is, reduces a delay of the change of the sum of the square values of the two-phase currents) more than at the time of rotation of the three-phase motor, and the amounts of temperature rises of the coils of the three-phase motor are calculated. Further, by adding up the amounts of temperature rises of the coils of the three-phase motor, and an ambient temperature (a mass estimation temperature) of the three-phase motor, the estimation temperatures of the coils of the three-phase motor are calculated.

JP 2003-284375 A is a patent document which may be related to the present disclosure.

SUMMARY

In the motor temperature estimating device disclosed in JP 2003-284375 A, the temperatures of the coils of the three-phase motor are estimated on the precondition that the magnitude of the current flowing in the U-phase coil, the magnitude of the current flowing in the V-phase coil and the magnitude of the current flowing in the W-phase coil of the three-phase motor are equal (that is, on the precondition that the temperature of the U-phase coil, the temperature of the V-phase coil and the temperature of the W-phase coil are equal).

If the three-phase motor rotates, the magnitude of the current flowing in the U-phase coil, the magnitude of the current flowing in the V-phase coil and the magnitude of the current flowing in the W-phase coil are equal to one another although the phases are different from one another. Thus, the temperatures of the coils of the three-phase motor can be accurately estimated even on the precondition that the temperature of the U-phase coil, the temperature of the V-phase coil and the temperature of the W-phase coil are equal.

However, at the time of stopping the polyphase motor having three phases or more, the currents flowing in the respective phase coils are not zero, but currents for keeping the state where the rotor of the polyphase motor stops with respect to the stator are flowing in the respective phase coils. In detail, at the time of stopping the polyphase motor having three phases or more, currents of magnitudes that are different from one another are flowing in the respective phase coils.

In the motor temperature estimating device disclosed in JP 2003-284375 A, at the time of stopping the three-phase motor, the temperatures of the coils of the three-phase motor are estimated on the precondition that the magnitude of the current flowing in the U-phase coil, the magnitude of the current flowing in the V-phase coil and the magnitude of the current flowing in the W-phase coil are equal, although the magnitude of the current flowing in the U-phase coil, the magnitude of the current flowing in the V-phase coil and the magnitude of the current flowing in the W-phase are different from one another.

Consequently, in the motor temperature estimating device disclosed in JP 2003-284375 A, there is a concern that the temperatures of the coils of the three-phase motor may not be estimated accurately at the time of stopping the three-phase motor.

In detail, in the motor temperature estimating device disclosed in JP 2003-284375 A, at the time of stopping the three-phase motor, the temperature of the phase coil in which a current larger than an average value of the current flowing in the U-phase coil, the current flowing in the V-phase coil and the current flowing in the W-phase coil flows may be estimated to be lower than the actual temperature, for example.

The present disclosure has been made to address the problem described above, and an object of the present disclosure is to provide a motor temperature estimating device that can accurately estimate temperatures of coils at both the time of rotation of a polyphase motor and stopping the polyphase motor.

An motor temperature estimating device according to the present disclosure includes: a polyphase motor that includes a first phase coil, a second phase coil and a third phase coil; a first phase current sensor configured to detect a current flowing in the first phase coil; a second phase current sensor configured to detect a current flowing in the second phase coil; a third phase current sensor configured to detect a current flowing in the third phase coil; a determination section configured to determine whether or not the polyphase motor is rotating; a transformation section configured to transform a first phase output signal that is an output signal of the first phase current sensor, a second phase output signal that is an output signal of the second phase current sensor, and a third phase output signal that is an output signal of the third phase current sensor to output post-transformation output signal; a first temperature estimation section configured to estimate a temperature of the polyphase motor during rotation; and a second temperature estimation section configured to estimate a temperature of the polyphase motor during stop. The post-transformation output signal is inputted to the first temperature estimation section. The first phase output signal, the second phase output signal, and the third phase output signal are inputted to the second temperature estimation section.

Namely, in the motor temperature estimating device according to the present disclosure, during rotation of the polyphase motor, the temperature of the polyphase motor is estimated from the post-transformation output signals that are obtained by transforming the first phase output signal that is the output signal of the first phase current sensor that detects the current flowing in the first phase coil, the second phase output signal that is the output signal of the second phase current sensor that detects the current flowing in the second phase coil, and the third phase output signal that is the output signal of the third phase current sensor that detects the current flowing in the third phase coil.

Consequently, with the motor temperature estimating device according to the present disclosure, during rotation of the polyphase motor, the temperatures of the first phase coil, the second phase coil and the third phase coil of the polyphase motor can be more accurately estimated While the arithmetic operation load is reduced more than in an example where the temperature of the polyphase motor is directly estimated from the first phase output signal, the second phase output signal and the third phase output signal.

Furthermore, in the motor temperature estimating device according to the present disclosure, during stop of the polyphase motor, the temperature of the polyphase motor is estimated from the first phase output signal, the second phase output signal and the third phase output signal.

That is, in the motor temperature estimating device according to the present disclosure, during stop of the polyphase motor, the magnitude of the first phase current, the magnitude of the second phase current, and the magnitude of the third phase current are taken into consideration, and the temperature of the polyphase motor is estimated.

Consequently, in the motor temperature estimating device according to the present disclosure, during stop of the polyphase motor, the temperatures of the first phase coil, the second phase coil and the third phase coil of the polyphase motor can be estimated more accurately than in an example where the temperature of the polyphase motor is estimated from the post-transformation output signals.

In the motor temperature estimating device according to the present disclosure, the post-transformation output signal may be any one of an effective current value of the first phase coil, an effective current value of the second phase coil, and an effective current value of the third phase coil.

Namely, in the motor temperature estimating device according to the present disclosure, during rotation of the polyphaser motor, the temperature of the polyphase motor is estimated from the effective current value (that is, a fixed value and one parameter) that is obtained by transforming the first phase output signal, the second phase output signal or the third phase output signal that varies with time.

Consequently, with the motor temperature estimating device according to the present disclosure, during rotation of the polyphaser motor, the arithmetic operation load and the storage capacity for storing the arithmetic operation results can be reduced more than an example where the temperature of the polyphase motor is estimated from, for example, a D-axis current and a Q-axis current (that is, the number of parameters is two).

The motor temperature estimating device according to the present disclosure may include an actuator configured to rotate by being driven by the polyphase motor. In the motor temperature estimating device according to the present disclosure, the determination section may be configured to determine, based on an operation of the actuator, whether or not the polyphase motor is rotating.

Namely, in the motor temperature estimating device according to the present disclosure, since the actuator operates when the polyphase motor rotates, it is determined whether or not the polyphase motor is rotating based on the operation of the actuator.

Consequently, in the motor temperature estimating device according to the present disclosure, if, for example, a sensor is provided to detect the operation of the actuator, it can be determined whether or not the polyphase motor is rotating without necessity to provide a sensor that detects the rotation of the polyphase motor separately.

The motor temperature estimating device according to the present disclosure may include an actuator configured to rotate by being driven by the polyphase motor. In the motor temperature estimating device according to the present disclosure, when the actuator is stopped, the current flowing in the first phase coil, the current flowing in the second phase coil, and the current flowing in the third phase coil may be reduced, and the determination section may be configured to determine that the polyphase motor is stopped.

When a vehicle that includes an electric active stabilizer to which the polyphase motor 1 is applied continues a high load running such as a performance driving and a mountain-road running, the actuator that rotates by being driven by the polyphase motor needs to continue to generate a large torque for a long time period, and the temperature of the coils of the polyphase motor readily rise.

In the light of the above respect, in the motor temperature estimating device according to the present disclosure, the current flowing in the first phase coil, the current flowing in the second phase coil and the current flowing in the third coil are reduced when the actuator stops after continuing to generate a large torque for a long time period, for example.

Consequently, in the motor temperature estimating device according to the present disclosure, temperature rises of the first phase coil, the second phase coil and the third phase coil of the polyphase motor can be suppressed more than in an example where the current flowing in the first phase coil, the current flowing in the second phase coil and the current flowing in the third phase coil are not reduced when the actuator stops.

Further, in the motor temperature estimating device according to the present disclosure, since the actuator operates when the polyphase motor rotates, it is determined that the polyphase motor remains stopped based on stop of the actuator.

Consequently, in the motor temperature estimating device according to the present disclosure, if, for example, a sensor for detecting the operation of the actuator is provided, it can be determined that the polyphase motor stops without necessity to provide a sensor that detects the rotation of the polyphase motor separately.

In the motor temperature estimating device according to the present disclosure, a speed reducer may he interposed between the polyphase motor and the actuator so that a stopped state of the actuator is kept even when the current flowing in the first phase coil, the current flowing in the second phase coil, and the current flowing in the third phase coil are reduced.

Namely, in the motor temperature estimating device according to the present disclosure, the speed reducer is interposed between the polyphase motor and the actuator, so that a stopped state of the actuator is kept even when the current flowing in the first phase coil, the current flowing in the second phase coil and the current flowing in the third phase coil of the polyphase motor are reduced. Thus, the current flowing in the first phase coil, the current flowing in the second phase coil and the current flowing in the third phase coil are reduced, and the state where a rotor of the polyphase motor is stopped with respect to a stator can be kept.

That is, in the motor temperature estimating device according to the present disclosure, the temperature rises of the first phase coil, the second phase coil and the third phase coil of the polyphase motor can be suppressed, and the state Where the rotor of the polyphase motor is stopped with respect to the stator can be kept.

The motor temperature estimating device according to the present disclosure may include a storage section configured to store an amount of temperature rise of the first phase coil, which is calculated by the second temperature estimation section based on the first phase output signal, an amount of temperature rise of the second phase coil, which is calculated by the second temperature estimation section based on the second phase output signal, and an amount of temperature rise of the third phase coil, which is calculated by the second temperature estimation section based on the third phase output signal. In the motor temperature estimating device according to the present disclosure, the polyphase motor may be applied to a vehicle that includes a power supply.

In the motor temperature estimating device according to the present disclosure, a largest value of the amount of temperature rise of the first phase coil, the amount of temperature rise of the second phase coil, and the amount of temperature rise of the third phase coil at a time of the power supply of the vehicle being turned off may be stored by the storage section, and may be used in estimation of a temperature of the polyphase motor at a time of the power supply of the vehicle being turned on next.

Namely, in the motor temperature estimating device according to the present disclosure, all of the amounts of temperature rises of the first phase coil, the amount of temperature rise of the second phase coil and the amount of temperature rise of the third phase coil of the polyphase motor at the time of the power supply of the vehicle being turned off are not stored by the storage section, but the largest value of the amount of temperature rise of the first phase coil, the amount of temperature rise of the second phase coil and the amount of temperature rise of the third phase coil is stored by the storage section.

Consequently, in the motor temperature estimating device according to the present disclosure, the capacity of the storage section can be reduced more than in the example where all of the amounts of temperature rises of the first phase coil, the amount of temperature rise of the second phase coil and the amount of temperature rise of the third phase coil of the polyphase motor are stored by the storage section.

Furthermore, in the motor temperature estimating device according to the present disclosure, the largest value of the amount of temperature rise of the first phase coil, the amount of temperature rise of the second phase coil and the amount of temperature rise of the third phase coil of the polyphase motor at the time of the power supply of the vehicle being turned off is used in estimation of the temperatures of the first phase coil, the second phase coil and the third phase coil of the polyphase motor at the time of the power supply of the vehicle being turned on next.

Consequently, in the motor temperature estimating device according to the present disclosure, the concern of the temperatures of the first phase coil, the second phase coil and the third phase coil being estimated to be lower than actual temperatures can be reduced at the time of the power supply of the vehicle being turned on next.

In the motor temperature estimating device according to the present disclosure, a largest value and a second largest value of an amount of temperature rise of the first phase coil, an amount of temperature rise of the second phase coil, and an amount of temperature rise of the third phase coil at a time of the power supply of the vehicle being turned off may be stored by the storage section, and either one of the largest value and the second largest value may be used in estimation of a temperature of the polyphase motor at a time of the power supply of the vehicle being turned on next.

Namely, in the motor temperature estimating device according to the present disclosure, all of the amounts of temperature rises of the first phase coil, the amount of temperature rise of the second phase coil and the amount of temperature rise of the third phase coil of the polyphase motor at the time of the power supply of the vehicle being turned off are not stored, but the largest value and the second largest value of the amount of temperature rise of the first phase coil, the amount of temperature rise of the second phase coil and the amount of temperature rise of the third phase coil are stored by the storage section.

Consequently, in the motor temperature estimating device according to the present disclosure, the capacity of the storage section can be made smaller than in the example where all of the amounts of temperature rises of the first phase coil, the amount of temperature rise of the second phase coil and the amount of temperature rise of the third phase coil of the polyphase motor are stored by the storage section.

Furthermore, in the motor temperature estimating device according to the present disclosure, either the largest value or the second largest value of the amount of temperature rise of the first phase coil, the amount of temperature rise of the second phase coil and the amount of temperature rise of the third phase coil of the polyphase motor at the time of the power supply of the vehicle being turned off is used in estimation of the temperatures of the first phase coil, the second phase coil and the third phase coil of the polyphase motor at the time of the power supply of the vehicle being turned on next.

Consequently, in the motor temperature estimating device according to the present disclosure, the concern of the temperatures of the first phase coil, the second phase coil and the third phase coil being estimated to be lower than actual temperatures can be reduced at the time of the power supply of the vehicle being turned on next.

According to the motor temperature estimating device of the present disclosure, the temperatures of the coils can be accurately estimated at both the time of rotation of a polyphase motor and stopping the polyphase motor.

BRIEF DESCRIPTION OF THE DRAWINGS

FIGS. 6A and 6B are time charts for explaining effects of the primary filters of the motor temperature estimating device according to the first embodiment;

FIG. 7 is a diagram illustrating an application example of the motor temperature estimating device according to the first embodiment;

DETAILED DESCRIPTION

First Embodiment

Figure 1:
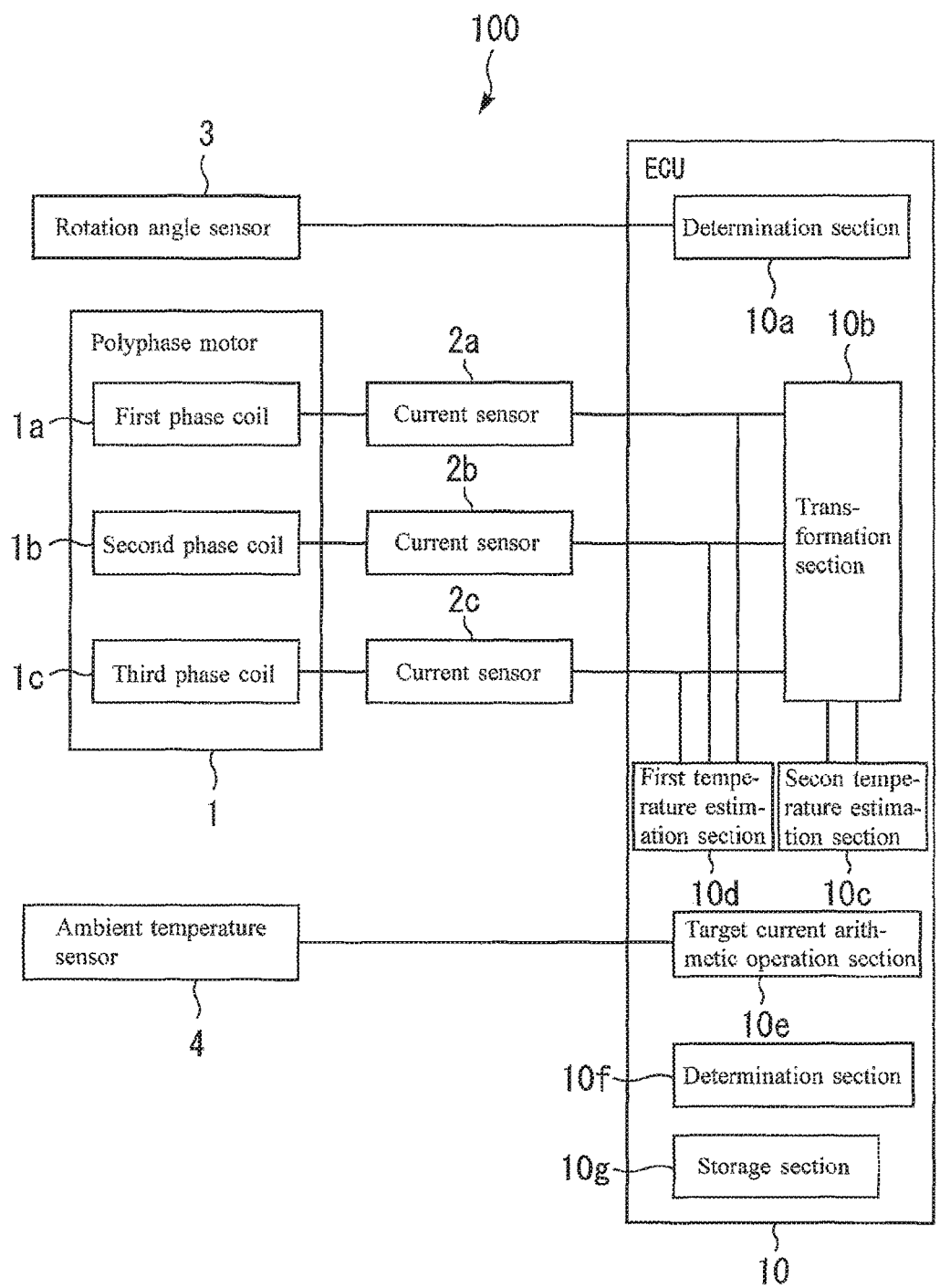
FIG. 1 is a schematic configuration diagram of a motor temperature estimating device according to a first embodiment.

Hereinafter, a first embodiment concerning a motor temperature estimating device of the present disclosure will be described. FIG. 1 is a schematic configuration diagram of a motor temperature estimating device 100 according to the first embodiment.

In an example illustrated in FIG. 1 to which the motor temperature estimating device 100 according to the first embodiment is applied, a polyphase motor 1 having a first phase coil 1a, a second phase coil 1b and a third phase coil 1c is provided. In the example illustrated in FIG. 1, the polyphase motor 1 is a three-phase motor having three phases, so that the first phase coil 1a corresponds to a U-phase coil, the second phase coil 1b corresponds to a V-phase, and the third phase coil 1c corresponds to a W-phase coil.

In the example illustrated in FIG. 1 to which the motor temperature estimating device 100 according to the first embodiment is applied, a current flowing in the first phase coil 1a is detected by a first phase current sensor 2a, a current flowing in the second phase coil 1b is detected by a second phase current sensor 2b, and a current flowing in the third phase coil 1c is detected by a third phase current sensor 2c.

In the example illustrated in FIG. 1, the current sensors 2a, 2b and 2c are provided separately from an ECU (an electronic control unit) 10, but in another example, the current sensors 2a, 2h and 2c can be provided in the ECU 10, instead of the above.

Figure 2:
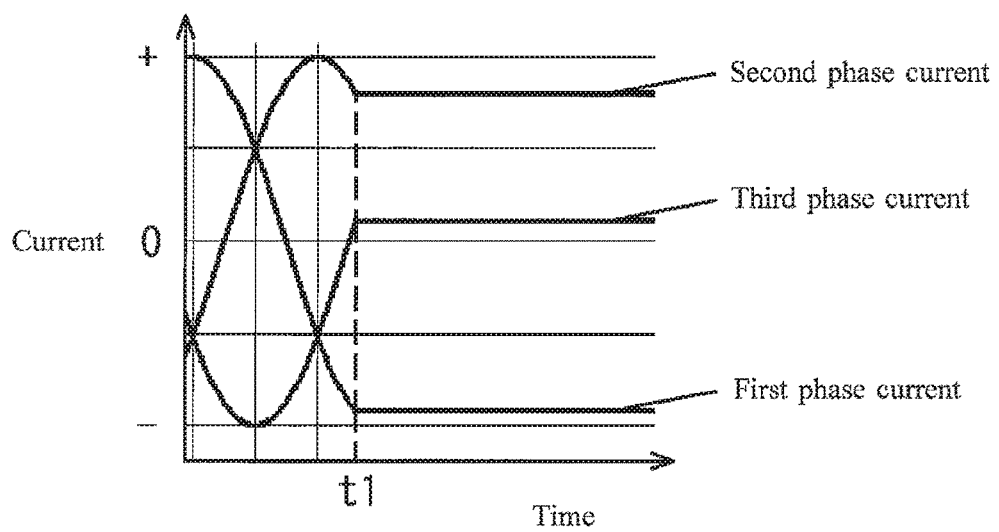
FIG. 2 is a diagram for explaining a relationship among the current (first phase current) flowing in a first phase coil, the current (second phase current) flowing in a second phase coil, and the current (third phase current) flowing in a third phase coil which are illustrated in FIG. 1.

FIG. 2 is a diagram for explaining a relationship among the current (the first phase current) flowing in the first phase coil 1a, the current (the second phase current) flowing in the second phase coil 1b, and the current (the third phase current) flowing in the third phase coil 1c which are illustrated in FIG. 1.

As illustrated in FIG. 2, during rotation (at or before a time point t1) of the polyphase motor (three-phase motor) 1 (see FIG. 1) of the motor temperature estimating device 100 according to the first embodiment, a time waveform of the first phase current, a time waveform of the second phase current and a time waveform of the third phase current are sine waves in which phases differ from one another by 120 degrees.

During rotation of the polyphase motor (three-phase motor) 1, the magnitude of the first phase current, the magnitude of the second phase current and the magnitude of the third phase current can be considered to be equal to one another although the phase of the first phase current, the phase of the second phase current and the phase of the third phase current differ from one another, and therefore, the temperatures of the first phase coil 1a, the second phase coil 1b and the third phase coil 1c can be accurately estimated, on the precondition that the temperature of the first phase coil 1a (see FIG. 1), the temperature of the second phase coil 1b (see FIG. 1) and the temperature of a third phase coil 1c (see FIG. 1) are equal.

In the light of the above respect, in the example illustrated in FIG. 1 to which the motor temperature estimating device 100 according to the first embodiment is applied, a rotation angle sensor 3 that detects the rotation angle of the polyphase motor (three-phase motor) 1 is provided. Further, a determination section 10a that determines whether or not the polyphase motor (three-phase motor) 1 is rotating based on an output signal of the rotation angle sensor 3 is provided in the ECU 10.

If the determination section 10a determines that the polyphase motor 1 is rotating (that is, during rotation of the polyphase motor 1), an output signal (the first phase current) of the current sensor 2a, an output signal (the second phase current) of the current sensor 2b and an output signal (the third phase current) of the current sensor 2c are subjected to a three-phase to two-phase transformation by a transformation section 10b. Next, a D-axis current and a Q-axis current that are post-transformation output signals are outputted to a first temperature estimation section 10c from the transformation section 10b. Next, based on the D-axis current and the Q-axis current, the first temperature estimation section 10c estimates the temperatures (in detail, the amounts of temperature rises) of the first phase coil 1a, the second phase coil 1b and the third phase coil 1c of the polyphase motor 1 during rotation.

Meanwhile, during stop (at or after the time point t1) of the polyphase motor (three-phase motor) 1 (see FIG. 1) of the motor temperature estimating device 100 according to the first embodiment, the first phase current, the second phase current and the third phase current do not become zero, but in order to keep a state where a rotor (not illustrated) of the polyphase motor 1 is stopped with respect to a stator (not illustrated), the first phase current flows in the first phase coil 1a (see FIG. 1), the second phase current flows in the second phase coil 1b (see FIG. 1), and the third phase current flows in the third phase coil 1c (see FIG. 1).

In detail, as illustrated in FIG. 2, during stop (at or after the time point t1) of the polyphase motor 1, the first phase current, the second phase current and the third phase current are kept at respective values at the time (the time point t1) at which the polyphase motor 1 stops. Further, the value of the first phase current, the value of the second phase current and the value of the third phase current at the time (the time point t1) at which the polyphase motor 1 stops are different from one another.

If the temperatures of the first phase coil 1a, the second phase coil 1b and the third phase coil 1c of the polyphase motor 1 are estimated on the precondition that the magnitude of the first phase current, the magnitude of the second phase current and the magnitude of the third phase current are equal although the magnitude of the first phase current, the magnitude of the second phase current and the magnitude of the third phase current differ from one another during stop of the polyphase motor 1 (at or after the time point t1), the temperatures of the first phase coil 1a, the second phase coil $1b$ and the third phase coil $1c$ of the polyphase motor 1 during stop of the polyphase motor 1 cannot be accurately estimated.

More specifically, in the example illustrated in FIG. 2, if the temperatures of the first phase coil $1a$, the second phase coil $1b$ and the third phase coil $1c$ of the polyphase motor 1 are estimated on the precondition that the magnitude of the first phase current, the magnitude of the second phase current and the magnitude of the third phase current are equal to one another, the temperatures of the first phase coil $1a$ and the second phase coil $1b$ in which currents (in detail, currents of larger absolute values) that are larger than an average value (in detail, an average value of the absolute values) of the first phase current, the second phase current and the third phase current flow may be estimated as lower than actual temperatures.

In the light of the above respect, in the example illustrated in FIG. 1 to which the motor temperature estimating device 100 according to the first embodiment is applied, when the determination section 10*a* determines that the polyphase motor 1 remains stopped (during stop of the polyphase motor 1), the output signal (the first phase current) of the current sensor 2*a*, the output signal (the second phase current) of the current sensor 2*b* and the output signal (the third phase current) of the current sensor 2*c* are inputted to a second temperature estimation section 10*d* without being subjected to the three-phase to two-phase transformation by the transformation section 10*b*. Next, in the second temperature estimation section 10*d*, the temperatures of the first phase coil $1a$, the second phase coil $1b$ and the third phase coil $1c$ (in detail, the amounts of the temperature rises) of the polyphase motor 1 during stop (at or after the time point t1 in FIG. 2) are estimated based on the first phase current (see FIG. 2), the second phase current (see FIG. 2) and the third phase current (see FIG. 2).

Figure 3:
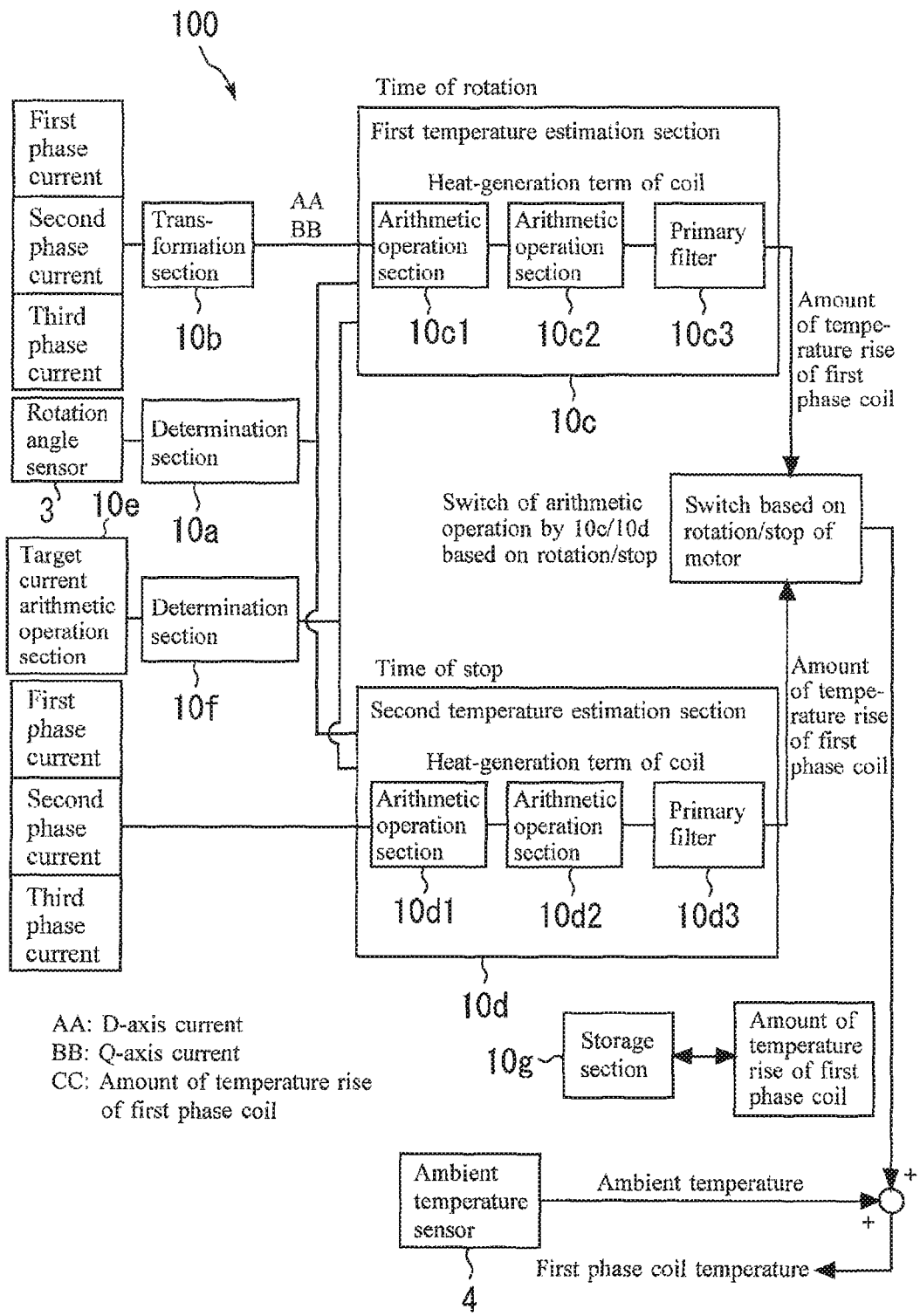
FIG. 3 is a diagram for minutely explaining a second temperature estimation section and a first temperature estimation section illustrated in FIG. 1.

FIG. 3 is a diagram for minutely explaining the second temperature estimation section 10*d* and the first temperature estimation section 10*c* illustrated in FIG. 1.

In an example illustrated in FIG. 3 to which the motor temperature estimating device 100 according to the first embodiment is applied, an arithmetic operation section 10*d*1, an arithmetic operation section 10*d*2 and a primary filter 10*d*3 are provided in the second temperature estimation section 10*d*.

In the example illustrated in FIG. 3, when the amount of temperature rise of the first phase coil $1a$ (see FIG. 1) by the first phase current is estimated by the second temperature estimation section 10*d* during stop of the polyphase motor 1 (see FIG. 1), for example, a square value of the first phase current is calculated in the arithmetic operation section 10*d*1. Next, an arithmetic operation result of the arithmetic operation section 10*d*1 is multiplied by a coefficient k1 in the arithmetic operation section 10*d*2. Next, a primary filter processing is carried out for an arithmetic operation result of the arithmetic operation section 10*d*2 in the primary filter 10*d*3. That is, in the primary filter 10*d*3, when a value of an input to the primary filter 10*d*3 changes, a delay processing is carried out, which slows the change, and the amount of temperature rise of the first phase coil $1a$ (a heat-generation term of the first phase coil $1a$) by the first phase current is outputted.

Further, in the example illustrated in FIG. 3, an ambient temperature of the polyphase motor 1 (see FIG. 1) is detected by an ambient temperature sensor 4, for example. Further, by adding up the ambient temperature and the amount of temperature rise of the first phase coil $1a$ by the first phase current, which is outputted by the primary filter 10*d*3, the temperature of the first phase coil $1a$ is calculated (estimated).

Further, in the example illustrated in FIG. 3, when the amount of temperature rise of the second phase coil $1b$ (see FIG. 1) by the second phase current is estimated by the second temperature estimation section 10*d* during stop of the polyphase motor 1 (see FIG. 1), for example, a square value of the second phase current is calculated in the arithmetic operation section 10*d*1. Next, an arithmetic operation result of the arithmetic operation section 10*d*1 is multiplied by the coefficient k1 in the arithmetic operation section 10*d*2. Next, in the primary filter 10*d*3, the primary filter processing is carried out to an arithmetic operation result of the arithmetic operation section 10*d*2, and the amount of temperature rise of the second phase coil $1b$ (a heat-generation term of the second phase coil $1b$) by the second phase current is outputted. Further, by adding up the ambient temperature of the polyphase motor 1 (see FIG. 1) that is detected by the ambient temperature sensor 4 and the amount of temperature rise of the second phase coil $1b$ by the second phase current, which is outputted from the primary filter 10*d*3, the temperature of the second phase coil $1b$ is calculated (estimated).

Likewise, in the example illustrated in FIG. 3, when the amount of temperature rise of the third phase coil $1c$ (see FIG. 1) by the third phase current is estimated by the second temperature estimation section 10*d* during stop of the polyphase motor 1, for example, a square value of the third phase current is calculated in the arithmetic operation section 10*d*1. Next, an arithmetic result of the arithmetic operation section 10*d*1 is multiplied by the coefficient k1 in the arithmetic operation section 10*d*2. Next, in the primary filter 10*d*3, the primary filter processing is carried out to an arithmetic result of the arithmetic operation section 10*d*2, and the amount of temperature rise of the third phase coil $1c$ (a heat-generation term of the third phase coil $1c$) by the third phase current is outputted. Further, by adding up the ambient temperature of the polyphase motor 1 that is detected by the ambient temperature sensor 4 and the amount of temperature rise of the third phase coil $1c$ by the third phase current, Which is outputted from the primary filter 10*d*3, the temperature of the third phase coil $1c$ is calculated (estimated).

In the example illustrated in FIG. 3 to which the motor temperature estimating device 100 according to the first embodiment is applied, an arithmetic operation section 10*c*1, an arithmetic operation section 10*c*2 and a primary filter 10*c*3 are provided in the first temperature estimation section 10*c* that estimates, during rotation, temperatures (the amounts of temperature rises in detail) of the first phase coil $1a$ (see FIG. 1), the second phase coil $1b$ (see FIG. 1) and the third phase coil $1c$ (see FIG. 1) of the polyphase motor 1 (see FIG. 1).

In the example illustrated in FIG. 3, during rotation of the polyphase motor 1, for example, the first phase current, the second phase current and the third phase current are subjected to the three-phase to two-phase transformation by the transformation section 10*b*, and the D-axis current and the Q-axis current are outputted to the first temperature estimation section 10*c* from the transformation section 10*b*. Next, in the arithmetic operation section 10*c*1 of the first temperature estimation section 10*c*, a sum of the square value of the D-axis current and the square value of the Q-axis current is calculated. Next, an arithmetic operation result of the arithmetic operation section 10*c*1 is multiplied by the coefficient k1 in the arithmetic operation section 10*c*2. Next, the primary filter processing is carried out to an arithmetic operation result of the arithmetic operation section 10c2, in the primary filter 10c3. That is, when a value of the input to the primary filter 10c3 changes, a delay processing of slowing the change is executed in the primary filter 10c3, and the amount of temperature rise of the first phase coil 1a (a heat-generation term of the first phase coil 1a) is outputted. Further, by adding up the ambient temperature of the polyphase motor 1, which is detected by the ambient temperature sensor 4, and the amount of temperature rise of the first phase coil 1a that is outputted from the primary filter 10c3, the temperature of the first phase coil 1a is calculated (estimated).

Furthermore, in the example illustrated in FIG. 3, the temperature of the second phase coil 1b and the temperature of the third phase coil 1c are estimated to be equal to the temperature of the first phase coil 1a.

As described above, in the example illustrated in FIG. 3 to which the motor temperature estimating device 100 according to the first embodiment is applied, the temperatures of the first phase coil 1a (see FIG. 1), the second phase coil 1b (see FIG. 1) and the third phase coil 1c (see FIG. 1) of the polyphase motor 1 (see FIG. 1) during rotation (at or before the time period t1 in FIG. 2) are calculated based on the arithmetic operation result of the first temperature estimation section 10c, and the temperatures of the first phase coil 1a, the second phase coil 1b and the third phase coil 1c of the polyphase motor 1 during stop (at or after the time period t1 in FIG. 2) are calculated based on the arithmetic operation result of the second temperature estimation section 10d.

Consequently, in the example illustrated in FIG. 3 to which the motor temperature estimating device 100 according to the first embodiment is applied, when a switch to stop from rotation of the polyphase motor 1 is performed (that is, the time point t1 in FIG. 2), the arithmetic operation result by the first temperature estimation section 10c needs to be transferred to the arithmetic operation by the second temperature estimation section 10d. Further, when a switch to rotation from stop of the polyphase motor 1 is performed, the arithmetic operation result of the second temperature estimation section 10d needs to be transferred to the arithmetic operation by the first temperature estimation section 10c.

Figure 4:
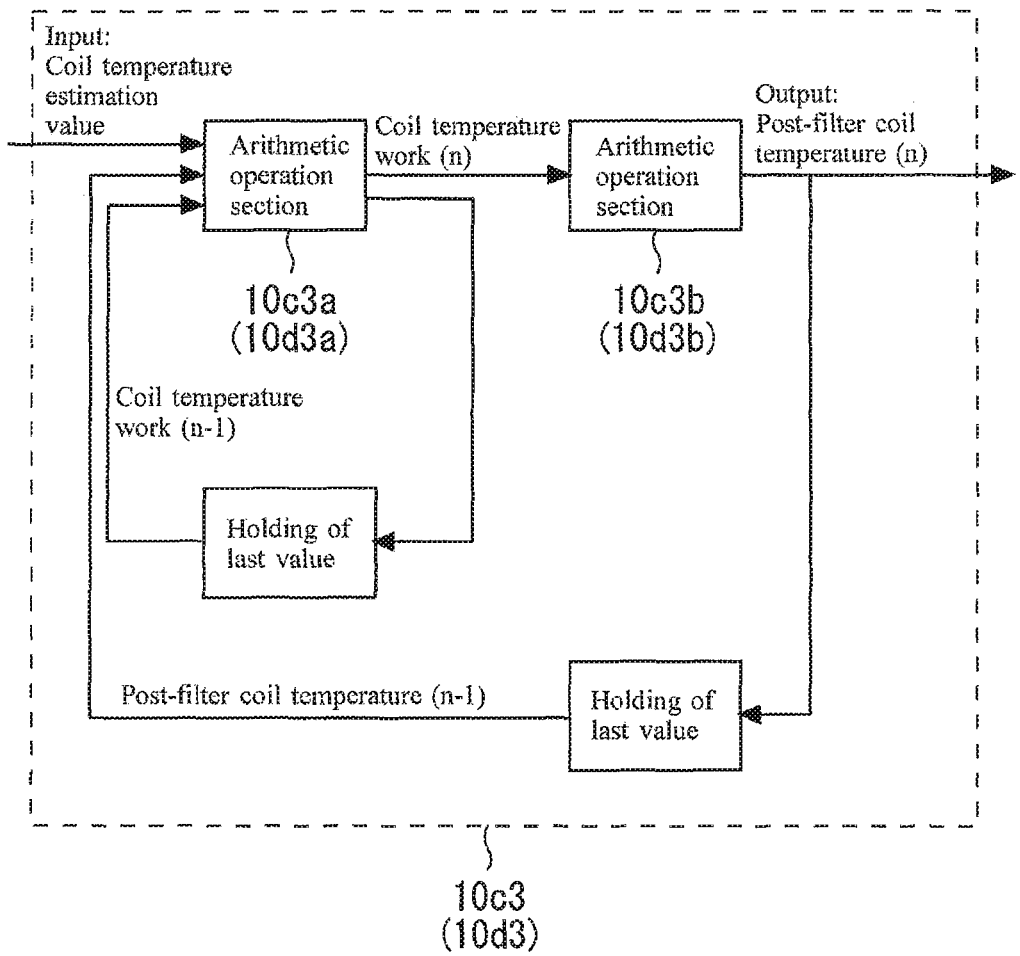
FIG. 4 is a diagram for minutely explaining primary filters illustrated in FIG. 3.

FIG. 4 is a diagram for minutely explaining the primary filter 10c3 (the primary filter 10d3) illustrated in FIG. 3.

In an example illustrated in FIG. 4 to which the motor temperature estimating device 100 according to the first embodiment is applied, an arithmetic operation section 10c3a, and an arithmetic operation section 10c3b are provided in the primary filter 10c3. At an n-th time arithmetic operation (n is a natural number larger than or equal to 2) by the arithmetic operation sections 10c3a and 10c3b, the "coil temperature estimation value" that is the arithmetic operation result of the arithmetic operation section 10c2 (see FIG. 3) is inputted to the arithmetic operation section 10c3a, a "coil temperature work (n)" is outputted from the arithmetic operation section 10c3a and is inputted to the arithmetic operation section 10c3b, and a "post-filter coil temperature (n)" that is the arithmetic operation result of the primary filter 100 (in detail, the amount of temperature rise of the first phase coil 1a (see FIG. 1), the second phase coil 1b (see FIG. 1) or the third phase coil 1c (see FIG. 1)) is outputted from the arithmetic operation section 10c3b.

In more detail, in the example illustrated in FIG. 4 to which the motor temperature estimating device 100 according to the first embodiment is applied, at an n-th time arithmetic operation (n is a natural number larger than or equal to 2) by the arithmetic operation section 10c3a, the "coil temperature work (n)" is calculated based on expression 1 mentioned below.

coil temperature work (n)=coil temperature work (n−1)+coil temperature estimation value−post-filter coil temperature (n−1)    (expression 1)

In expression 1, the "coil temperature work (n−1)" represents the arithmetic operation result of an (n−1) th time by the arithmetic operation section 10c3a, and the "post-filter coil temperature (n−1)" represents an (n−1) th time arithmetic operation result by the arithmetic operation section 10c3b.

Further, in the example illustrated in FIG. 4 to, which the tor temperature estimating device 100 according to the first embodiment is applied, at an n-th time arithmetic operation (n is a natural number larger than or equal to 2) by the arithmetic operation section 10c3b, the "post-filter coil temperature (n)" is calculated based on expression 2 mentioned below.

post-filter coil temperature (n)=coil temperature work (n)/coil temperature filter constant    (expression 2)

Furthermore, in the example illustrated in FIG. 4 to which the motor temperature estimating device 100 according to the first embodiment is applied, an arithmetic operation section 10d3a and an arithmetic operation section 10d3b are provided in the primary filter 10d3. At an n-th time arithmetic operation (n is a natural number larger than or equal to 2) by the arithmetic operation sections 10d3a and 10d3b, the "coil temperature estimation value" that is the arithmetic operation result of the arithmetic operation section 10d2 (see FIG. 3) is inputted to the arithmetic operation section 10d3a, the "coil temperature work (n)" is outputted from the arithmetic operation section 10d3a and is inputted to the arithmetic operation section 10d3b, and the "post-filter coil temperature (n)" that is the arithmetic operation result of the primary filter 10d3 (in detail, the amount of temperature rise of the first phase coil 1a (see FIG. 1), the second phase coil 1b (see FIG. 1) or the third phase coil 1c (see FIG. 1)) is outputted from he arithmetic operation section 10d3b.

In detail, in the example illustrated in FIG. 4 to which the motor temperature estimating device 100 according to the first embodiment is applied, at an n-th time arithmetic operation (n is a natural number larger than or equal to 2) by the arithmetic operation section 10d3a, the "coil temperature work (n)" is calculated based on expression 3 mentioned below.

coil temperature work (n)=coil temperature work (n−1)+coil temperature estimation value−post-filter coil temperature (n−1)    (expression 3)

in expression 3, the "coil temperature work (n−1)" represents an (n−1) th time arithmetic. operation result by the arithmetic operation section 10d3a, and the "post-filter coil temperature (n−1)" represents an (n−1) th time arithmetic operation result by the arithmetic operation section 10d3b.

Further, in the example illustrated in FIG. 4 to which the motor temperature estimating device 100 according to the first embodiment is applied, at an n-th time arithmetic operation (n is a natural number larger than or equal to 2) by the arithmetic operation section 10d3b, the "post-filter coil temperature (n)" is calculated based on expression 4 mentioned below.

post-filter coil temperature (n)=coil temperature work (n)/coil temperature filter constant    (expression 4)

In the example illustrated in FIG. 4 to which the motor temperature estimating device 100 according to the first embodiment is applied, when a switch to stop from rotation of the polyphase motor 1 (see FIG. 1) is performed (that is, at the time point t1 in FIG. 2), that is, when a first time arithmetic operation by the arithmetic operation section 10d3a is performed, the "coil temperature work (n−1)" is calculated based on expression 5 mentioned below, and the last arithmetic operation result of the first temperature estimation section 10c (see FIG. 3) is transferred to the first-time arithmetic operation by the arithmetic operation section 10d3a.

coil temperature work (n−1) post-filter coil temperature (n−1)*coil temperature filter constant    (expression 5)

In expression 5, the "coil temperature work (n−1)" represents a first-time arithmetic operation result by the arithmetic operation section 10d3a, and the "post-filter coil temperature (n−1)" represents a last arithmetic operation result by the first temperature estimation section 10c (that is a last arithmetic operation result by the first temperature estimation section 10c during rotation of the polyphase motor 1).

More specifically, when a switch to stop from rotation of the polyphase motor 1 is performed (that is, at the time point t1 in FIG. 2), a result of multiplying, by the "coil temperature filter constant", the "post-filter coil temperature (n−1)" that is a last arithmetic operation result by the first temperature estimation section 10c during rotation of the polyphase motor 1 is outputted from the arithmetic operation section 10d3a.

Further, in the example illustrated in FIG. 4 to which the motor temperature estimating device 100 according to the first embodiment is applied, when a switch to stop from rotation of the polyphase motor 1 (see FIG. 1) is performed (that is, at the time point t1 in FIG. 2), that is, when the first-time arithmetic operation by the arithmetic operation section 10d3b is performed, the "post-filter coil temperature (n−1)" is calculated based on expression 6 mentioned below.

post-filter coil temperature (n−1)=post-filter coil temperature (n−1)*coil temperature filter constant    (expression 6)

That is, when a switch to stop from rotation of the polyphase motor 1 is performed (that is, at the time point t1 in FIG. 2), a result of multiplying, by the "coil temperature filter constant", the "post-filter coil temperature (n−1)" that is the last arithmetic operation result by the first temperature estimation section 10c during rotation of the polyphase motor 1 is outputted from the arithmetic operation section 10d3b.

Furthermore, in the example illustrated in FIG. 4 to which the motor temperature estimating device 100 according to the first embodiment is applied, when a switch to rotation from stop of the polyphase motor 1 (see FIG. 1) is performed (that is, at a time point t13 in FIGS. 6A and 6B), that is, when the first-time arithmetic operation by the arithmetic operation section 10c3a is performed, the "coil temperature work (n−1)" is calculated based on expression 7 mentioned below, and the last arithmetic operation result by the second temperature estimation section 10d (see FIG. 3) is transferred to the first-time arithmetic operation by the arithmetic operation section 10c3a.

coil temperature work (n−1)=post-filter coil temperature (n−1)*coil temperature filter constant    (expression 7)

In expression 7, the "coil temperature work (n−1)" represents a first-time arithmetic operation result by the arithmetic operation section 10c3a, and the "post-filter coil temperature (n−1)" represents a last arithmetic operation result by the second temperature estimation section 10d (that is, a last arithmetic operation result by the second temperature estimation section 10d during stop of the polyphase motor 1).

That is, when a switch to rotation from stop of the polyphase motor 1 is performed (that is, at the time point t13 in FIGS. 6A and 6B), a result of multiplying, by the "coil temperature filter constant", the "post-filter coil temperature (n−1)" that is the last arithmetic operation result by the second temperature estimation section 10d during stop of the polyphase motor 1 is outputted from the arithmetic operation section 10e3a.

Further, in the example illustrated in FIG. 4 to which the motor temperature estimating device 100 according to the first embodiment is applied, when a switch to rotation from stop of the polyphase motor 1 (see FIG. 1) is performed (that is, at the time point t13 in FIGS. 6A and 6B), that is, when the first-time arithmetic operation by the arithmetic operation section 10c3b is performed, the "post-filter coil temperature (n−1)" is calculated based on expression 8 mentioned below.

post-filter coil temperature (n−1)=post-filter coil temperature (n−1)*coil temperature filter constant    (expression 8)

That is, when a switch to rotation from stop of the polyphase motor 1 is performed (that is, at the time point t13 in FIGS. 6A and 6B), a result of multiplying, by the "coil temperature filter constant", the "post-filter coil temperature (n−1)" that is the last arithmetic operation result by the second temperature estimation section 10d during stop of the polyphase motor 1 is outputted from the arithmetic operation section 10c3b.

Figure 5:
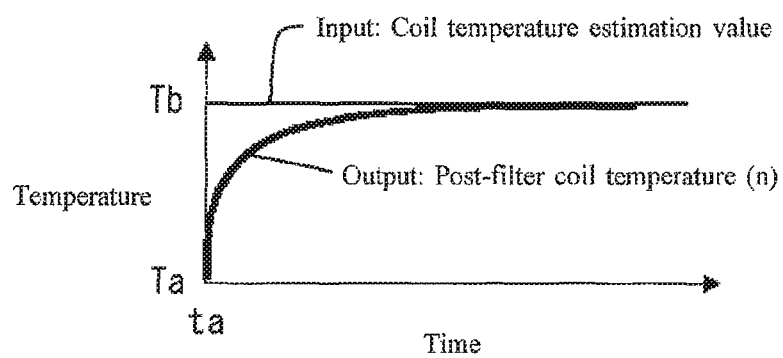
FIG. 5 is a time chart for explaining an example of the input and output of each of the primary filters illustrated in FIG. 4.

FIG. 5 is a time chart for explaining an example of the input and output of the primary filter 10c3 (primary filter 10d3) illustrated in FIG. 4.

As illustrated in FIG. 5, in the motor temperature estimating device 100 according to the first embodiment, when "the coil temperature estimation value" that is inputted to the primary filter 10c3 (see FIGS. 3 and 4) changes to a value Tb from a value Ta in a step manner at a time point ta, "the post-filter coil temperature (n)" that is outputted from the primary filter 10c3 changes to the value Tb from the value Ta more gradually than the change of "the coil temperature estimation value", that is, with a delay time corresponding to the heat capacity of the polyphase motor 1 (see FIG. 1).

Likewise, as illustrated in FIG. 5, in the motor temperature estimating device 100 according to the first embodiment, when "the coil temperature estimation value" that is inputted to the primary filter 10d3 (see FIGS. 3 and 4) changes to the value Tb from the value Ta in a step manner at the time point ta, "the post-filter coil temperature (n)" that is outputted from the primary filter 10d3 changes to the value Tb from the value Ta more gradually than the change of "the coil temperature estimation value", that is, with the delay time corresponding to the heat capacity of the polyphase motor 1.

FIGS. 6A and 6B are time charts for explaining effects of the primary filters 10c3 and 10d3 of the motor temperature estimating device 100 according to the first embodiment. In detail, FIG. 6A is a time chart of the amount of temperature rise of the coil of the example to which the motor temperature estimating device 100 according to the first embodiment is applied in which the last arithmetic operation result (the amount of temperature rise of the coil) by the first temperature estimation section 10c (see FIG. 3) during rotation of the polyphase motor 1 (see FIG. 1) is transferred to the first-time arithmetic operation result (the amount of temperature rise of the coil) by the second temperature estimation section 10d. (see FIG. 3) during stop of the polyphase motor 1, and the last arithmetic operation result (the amount of temperature rise of the coil) by the second temperature estimation section 10d. during stop of the polyphase motor 1 is transferred to the first-time arithmetic operation result (the amount of temperature rise of the coil) by the first temperature estimation section 10c during rotation of the polyphase motor 1. FIG. 6B is a time chart of the amount of temperature rise of a coil of a comparative example in which the last arithmetic operation result (the amount of temperature rise of the coil) by the first temperature estimation section 10c during rotation of the polyphase motor 1 is not transferred to the first-time arithmetic operation result (the amount of temperature rise of the coil) by the second temperature estimation section 10d during stop of the polyphase motor 1, and the last arithmetic operation result (the amount of temperature rise of the coil) by the second temperature estimation section 10d during stop of the polyphase motor 1 is not transferred to the first-time arithmetic operation result (the amount of temperature rise of the coil) by the first temperature estimation section 10c during rotation of the polyphase motor 1.

In the example to which the motor temperature estimating device 100 according to the first embodiment is applied, as illustrated in FIG. 6A, the amount of temperature rise of the coil, which is outputted from the first temperature estimation section 10c (see FIG. 3) during rotation (a time period from t11 to t12) of the polyphase motor 1 (see FIG. 1) reaches a value T1. Next, at a time point t12, the value T1 of the amount of temperature rise of the coil, which is outputted from the first temperature estimation section 10c, is transferred to the second temperature estimation section 10d (see FIG. 3), and is outputted therefrom. At a time point t13, the amount (a value T2) of temperature rise of the coil during stop (a time period from t12 to t13) of the polyphase motor 1 is added to the value T1, and the amount of temperature rise of the coil, which is outputted from the second temperature estimation section 10d reaches a value (T1+T2). Next, at the time point t13, the value (T1+T2) of the amount of temperature rise of the coil, which is outputted from the second temperature estimation section 10d, is transferred to the first temperature estimation section 10c, and is outputted therefrom. Next, the amount of temperature rise of the coil during rotation (at or after the time point t13) of the polyphase motor 1 is added to the value (T1+T2).

That is, in the example to which the motor temperature estimating device 100 according to the first embodiment is applied, the output (the amount of temperature rise of the coil) is transferred between the first temperature estimation section 10c and the second temperature estimation section 10d, and therefore continuity of the amount of temperature rise of the coil which is estimated can be kept during rotation and stop of the polyphase motor 1.

In contrast, in the comparative example, as illustrated in FIG. 6B, a last arithmetic operation result (the amount of temperature rise of the coil at the time point t12) of the first temperature estimation section 10c during rotation (the time period from t11 to t12) of the polyphase motor 1 is not transferred, and a first-time arithmetic operation result (the amount of temperature rise of the coil at the time point t12) by the second temperature estimation section 10d during stop (the time period from t12 to t13) of the polyphase motor 1 becomes zero. Further, a last arithmetic operation result (the amount of temperature rise of the coil at the time point t13) of the second temperature estimation section 10d during stop (the time period from t12 to t13) of the polyphase motor 1 is not transferred, and a first-time arithmetic operation result (the amount of temperature rise of the coil at the time point t13) by the first temperature estimation section 10c during rotation (at or after the time point t13) of the polyphase motor 1 becomes zero again.

Consequently, in the comparative example illustrated in FIG. 6B, the temperatures of the first phase coil 1a (see FIG. 1), the second phase coil 1b (see FIG. 1) and the third phase coil 1c (see FIG. 1) of the polyphase motor 1 may be estimated to be lower than actual temperatures.

As described above, in the motor temperature estimating device 100 according to the first embodiment, during rotation of the polyphase motor 1 (see FIG. 1), the temperature of the polyphase motor 1 is estimated from the D-axis current (see FIG. 3) and the Q-axis current (see FIG. 3) that are post-transformation output signals that are obtained by transforming, with the transformation section 10b (see FIG. 1), the first phase output signal that is the output signal of the current sensor 2a (see FIG. 1) that detects the first phase current flowing in the first phase coil 1a (see FIG. 1), the second phase output signal that is the output signal of the current sensor 2b (see FIG. 1) that detects the second phase current flowing in the second phase coil 1b (see FIG. 1), and the third phase output signal that is the output signal of the current sensor 2c (see FIG. 1) that detects the third phase current flowing in the third phase coil 1c (see FIG. 1).

Consequently, with the motor temperature estimating device 100 according to the first embodiment, during rotation of the polyphase motor 1, the temperatures of the first phase coil 1a, the second phase coil 1b and the third phase coil 1c of the polyphase motor 1 can be more accurately estimated while the arithmetic operation load and the capacity of the storage section 10g (see FIG. 1) that stores the arithmetic operation results are reduced more than in an example where the temperature of the polyphase motor 1 is directly estimated from the first phase output signal, the second phase output signal and the third phase output signal.

In other words, with the motor temperature estimating device 100 according to the first embodiment, the D-axis current and the Q-axis current (that is, the number of parameters is two) are used, instead of the first phase current, the second phase current and the third phase current (that is, the number of parameters is three) in order to estimate, with the first temperature estimation section 10c (see FIG. 1), the temperatures of the first phase coil 1a, the second phase coil 1b and the third phase coil 1c of the polyphase motor 1 during rotation. Consequently, with the motor temperature estimating device 100 according to the first embodiment that uses the two parameters during rotation of the polyphase motor 1, the arithmetic operation load in the first temperature estimation section 10c and the capacity of the storage section 10g that stores the arithmetic operation results can be reduced more than the example where the three parameters are used during rotation of the polyphase motor 1.

Furthermore, in the motor temperature estimating device 100 according to the first embodiment, during stop of the polyphase motor 1, the temperature of the polyphase motor 1 is estimated by the second temperature estimation section 10d (see FIG. 1) from the first phase output signal, the second phase output signal and the third phase output signal.

That is, in the motor temperature estimating device 100 according to the first embodiment, during stop of the polyphase motor 1 (at or after the time point t1 in FIG. 2), the magnitude of the first phase current (see FIG. 2), the magnitude of the second phase current (see FIG. 2), and the magnitude of the third phase current (see FIG. 2) are taken into consideration, and the temperature of the polyphase motor 1 is estimated.

Consequently, in the motor temperature estimating device 100 according to the first embodiment, during stop of the polyphase motor 1, the temperatures of the first phase coil 1a, the second phase coil 1b and the third phase coil 1c of the polyphase motor 1 can be estimated more accurately than in the example where the temperature of the polyphase motor 1 is estimated from the post-transformation output signals (the D-axis current and the Q-axis current) on the precondition that the magnitude of the first phase current, the magnitude of the second phase current and the magnitude of the third phase current are equal.

FIG. 7 is a diagram illustrating an application example of the motor temperature estimating device 100 according to the first embodiment.

In the example illustrated in FIG. 7, the motor temperature estimating device 100 according to the first embodiment is applied to an electric active stabilizer 150.

The electric active stabilizer 150 illustrated in FIG. 7 can be applied to either of the front wheel side and the rear wheel side of the vehicle (not illustrated).

In the example illustrated in FIG. 7 to which the motor temperature estimating device 100 according to the first embodiment is applied to the electric active stabilizer 150, a left stabilizer bar 52L, a right stabilizer bar 52R and an actuator 50 that rotates by being driven-by the polyphase motor 1 are provided. The left stabilizer bar 52L is mounted to the chassis (not illustrated) of the vehicle via a left mounting member 53L. The right stabilizer bar 52R is mounted to the chassis of the vehicle via a right mounting member 53R. The actuator 50 is disposed between the left stabilizer bar 52L and the right stabilizer bar 52R, and includes the polyphase motor 1 and a speed reducer 51.

In the example illustrated in FIG. 7 to which the motor temperature estimating device 100 according to the first embodiment is applied to the electric active stabilizer 150, for example, a known harmonic gear mechanism (may be called a "harmonic drive (registered trademark) mechanism") (see JP 2010-215002 A, for example) can be used as the speed reducer 51.

In another example in which the motor temperature estimating device 100 according to the first embodiment is applied to the electric active stabilizer 150, for example, a known planetary gear device (see Japanese Patent No. 5626467, for example) can be used as the speed reducer 51, instead of the above.

In the example illustrated in FIG. 7 in which the motor temperature estimating device 100 according to the first embodiment is applied to the electric active stabilizer 150, the right stabilizer bar 52R is connected to the stator (not illustrated) of the polyphase motor 1 of the actuator 50. Further, the left stabilizer bar 52L is connected to the rotor (not illustrated) of the polyphase motor 1 of the actuator 50 via the speed reducer 51 of the actuator 50.

In another example in which the motor temperature estimating device 100 according to the first embodiment is applied to the electric active stabilizer 150, the left stabilizer bar 52L can be connected to the stator of the polyphase motor 1 of the actuator 50, and the right stabilizer bar 52R can be connected to the rotor of the polyphase motor 1 of the actuator 50 via the speed reducer 51 of the actuator 50, instead of the above.

Figure 8:
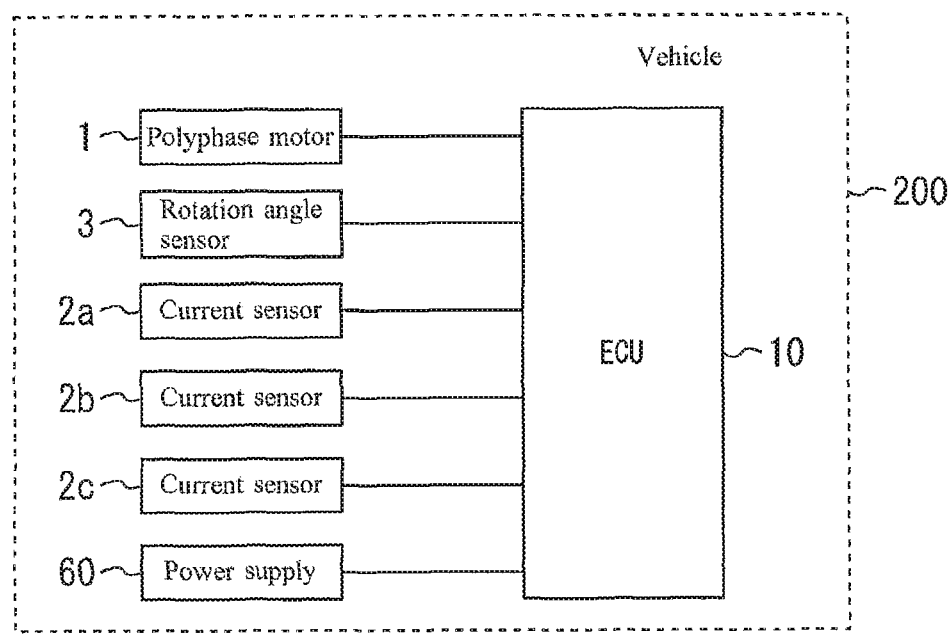
FIG. 8 is a diagram illustrating another application example of the motor temperature estimating device according to the first embodiment.

FIG. 8 is a diagram illustrating another application example of the motor temperature estimating device 100 according to the first embodiment.

In the example illustrated in FIG. 8, the motor temperature estimating device 100 according to the first embodiment is applied to a vehicle 200 that includes the electric active stabilizer 150 (see FIG. 7). The vehicle 200 is provided with a power supply 60.

In the example illustrated in FIG. 8 in which the motor temperature estimating device 100 according to the first embodiment is applied to the vehicle 200, the storage section 10g (see FIG. 1) is provided to store the amount of temperature rise of the first phase coil 1a (see FIG. 1) of the polyphase motor 1 (see FIGS. 1 and 8) during stop, which is calculated by the second temperature estimation section 10d (see FIG. 1) based on the first phase output signal from the current sensor 2a (FIGS. 1 and 8), the amount of temperature rise of the second phase coil 1b (see FIG. 1) of the polyphase motor 1 during stop, which is calculated by the second temperature estimation section 10d based on the second phase output signal from the current sensor 2b (see FIGS. 1 and 8), and the amount of temperature rise of the third phase coil 1c (see FIG. 1) of the polyphase motor 1 during stop, which is calculated by the second temperature estimation section 10d based on the third phase output signal from the current sensor 2c (see FIGS. 1 and 8).

In the example illustrated in FIG. 8 in which the motor temperature estimating device 100 according to the first embodiment is applied to the vehicle 200, measures to enhance the precision of the temperature estimation is taken when the polyphase motor 1 (see FIGS. 1 and 8) is stopped, the power supply 60 of the vehicle 200 is turned off, the power supply 60 is then turned on after a lapse of a fixed time period, and the temperatures of the first phase coil 1a (see FIG. 1), the second phase coil 1b (see FIG. 1) and the third phase coil 1c (see FIG. 1) of the polyphase motor 1 are estimated by the first temperature estimation section 10c (see FIG. 1) or the second temperature estimation section 10d (see FIG. 1).

More specifically, in the example illustrated in FIG. 8 in which the motor temperature estimating device 100 according to the first embodiment is applied to the vehicle 200, the largest value of the amount of temperature rise of the first phase coil 1a which is calculated by the second temperature estimation section 10d when the power supply 60 of the vehicle 200 is turned off, the amount of temperature rise of the second phase coil 1b which is calculated by the second temperature estimation section 10d when the power supply 60 of the vehicle 200 is turned off, and the amount of temperature rise of the third phase coil 1c which is calculated by the second temperature estimation section 10d when the power supply 60 of the vehicle 200 is turned off is stored by the storage section 10g (see FIG. 1). The largest value is transferred (that is, read out from the storage section 10g) as illustrated in FIG. 6A when the power supply 60 of the vehicle 200 is turned on next, and is used in estimation of the temperatures (that is, in setting of initial values of the estimation temperatures) of the first phase coil 1a, the second phase coil 1b and the third phase coil 1c of the polyphase motor 1 by the first temperature estimation section 10c or the second temperature estimation section 10d.

That is, in the example illustrated in FIG. 8 in which the motor temperature estimating device 100 according to the first embodiment is applied to the vehicle 200, all of the amounts of temperature rises of the first phase coil 1a (see FIG. 1), the amount of temperature rise of the second phase coil 1b (see FIG. 1) and the amount of temperature rise of the third phase coil 1c (see FIG. 1) of the polyphase motor 1 at the time of the power supply 60 of the vehicle 200 being turned off are not stored by the storage section 10g (see FIG.

1), but the largest value of the amount of temperature rise of the first phase coil 1*a*, the amount of temperature rise of the second phase coil 1*b* and the amount of temperature rise of the third phase coil 1*c* is stored by the storage section 10*g*.

Consequently, in the example illustrated in FIG. 8 in which the motor temperature estimating device 100 according to the first embodiment is applied to the vehicle 200, the capacity of the storage section 10*g* can be reduced more than in the example where all of the amounts of temperature rises of the first phase coil 1*a*, the amount of temperature rise of the second phase coil 1*b* and the amount of temperature rise of the third phase coil 1*c* of the polyphase motor 1 are stored by the storage section 10*g*.

Further, in the example illustrated in FIG. 8 in which the motor temperature estimating device 100 according to the first embodiment is applied to the vehicle 200, only the largest value of the amount of temperature rise of the first phase coil 1*a*, the amount of temperature rise of the second phase coil 1*b* and the amount of temperature rise of the third phase coil 1*c* is stored by the storage section 10*g*, and therefore, even when the power supply 60 is turned off and the power supply voltage is reduced, storage by the storage section 10*g* can be carried out.

Furthermore, in the example illustrated in FIG. 8 in which the motor temperature estimating device 100 according to the first embodiment is applied to the vehicle 200, the largest value of the amount of temperature rise of the first phase coil 1*a*, the amount of temperature rise of the second phase coil 1*b* and the amount of temperature rise of the third phase coil 1*c* of the polyphase motor 1 at the time of the power supply 60 of the vehicle 200 being turned off is used in estimation of the temperatures of the first phase coil 1*a*, the second phase coil 1*b* and the third phase coil 1*c* of the polyphase motor 1 at the time of the power supply 60 of the vehicle 200 being turned on next.

Consequently, in the example illustrated in FIG. 8 in which the motor temperature estimating device 100 according to the first embodiment is applied to the vehicle 200, the concern of the temperatures of the first phase coil 1*a*, the second phase coil 1*b* and the third phase coil 1*c* being estimated to be lower than actual temperatures can be reduced at the time of the power supply 60 of the vehicle 200 being turned on next.

In another example in which the motor temperature estimating device 100 according to the first embodiment is applied to the vehicle 200, instead of the above, the largest value and a second largest value of the amount of temperature rise of the first phase coil 1*a* (see FIG. 1), the amount of temperature rise of the second phase coil 1*b* (see FIG. 1) and the amount of temperature rise of the third phase coil 1*c* (see FIG. 1) at the time of the power supply 60 (see FIG. 8) of the vehicle 200 (see FIG. 8) being turned off may be stored by the storage section 10*g* (see FIG. 1), and either the largest value or the second largest value may be used in estimation of the temperature of the polyphase motor 1 (see FIG. 8) at the time of the power supply 60 of the vehicle 200 being turned on next.

That is, in the aforementioned example in which the motor temperature estimating device 100 according to the first embodiment is applied to the vehicle 200, all of the amounts of temperature rises of the first phase coil 1*a*, the amount of temperature rise of the second phase coil 1*b* and the amount of temperature rise of the third phase coil 1*c* of the polyphase motor 1 at the time of the power supply 60 of the vehicle 200 being turned off are not stored, but the largest value and the second largest value of the amount of temperature rise of the first phase coil 1*a*, the amount of temperature rise of the second phase coil 1*b* and the amount of temperature rise of the third phase coil 1*c* are stored by the storage section 10*g*.

Consequently, in the aforementioned example in which the motor temperature estimating device 100 according to the first embodiment is applied to the vehicle 200, the capacity of the storage section 10*g* can be made smaller than in the example where all of the amounts of temperature rises of the first phase coil 1*a*, the amount of temperature rise of the second. phase coil 1*b* and the amount of temperature rise of the third phase coil 1*c* of the polyphase motor 1 are stored by the storage section 10*g*.

Furthermore, in the other example in which the motor temperature estimating device 100 according to the first embodiment is applied to the vehicle 200, either the largest value or the second largest value of the amount of temperature rise of the first phase coil 1*a*, the amount of temperature rise of the second phase coil 1*b* and the amount of temperature rise of the third phase coil 1*c* of the polyphase motor 1 at the time of the power supply 60 of the vehicle 200 being turned off is used in estimation of the temperatures of the first phase coil 1*a*, the second phase coil 1*b* and the third phase coil 1*c* of the polyphase motor 1 at the time of the power supply 60 of the vehicle 200 being turned on next.

Consequently, in the other example in which the motor temperature estimating device 100 according to the first embodiment is applied to the vehicle 200, the concern of the temperatures of the first phase coil 1*a*, the second phase coil 1*b* and the third phase coil 1*c* being estimated to be lower than actual temperatures can be reduced at the time of the power supply 60 of the vehicle 200 being turned on next.

In the example illustrated in FIG. 7, the motor temperature estimating device 100 according to the first embodiment is applied to the electric active stabilizer 150, but in another example, the motor temperature estimating device 100 according to the first embodiment can also be applied to another device, such as an ARS (Active Rear Steering) device (see JP 2014-218098 A, for example), a VGRS (Variable Gear Ratio Steering) device (see Japanese Patent No. 5880730 B, for example), an active suspension (see JP 2013-126821 A, for example), an electric toe angle adjustment device (see JP 2012-71741 A, for example), an electric camber angle adjustment device (see JP 2007-30972 A, for example), or an electric tilt telescopic device (see JP 2010-100142 A, for example), instead of the above.

In the example illustrated in FIG. 1, the motor temperature estimating device 100 according to the first embodiment is applied to the polyphase motor 1 that includes the first phase coil (the U-phase coil) 1*a*, the second phase coil (the V-phase coil) 1*b* and the third phase coil (the W-phase coil) 1*c*, but in another example, the motor temperature estimating device 100 can also be applied to a polyphase motor having a larger number of phases than three, such as five phases or seven phases, instead of the above.

In the example illustrated in FIG. 3 to which the motor temperature estimating device 100 according to the first embodiment is applied, during rotation of the polyphase motor 1 (see FIG. 1), the D-axis current and the Q-axis current as the post-transformation output signals are inputted to the first temperature estimation section 10*c*, and are used in estimation of the temperatures of the first phase coil 1*a* (see FIG. 1), the second phase coil 1*b* (see FIG. 1) and the third phase coil 1*c* (see FIG. 1) with the first temperature estimation section 10*c*, but in another example to which the motor temperature estimating device 100 according to the first embodiment is applied, during rotation of the polyphase motor 1, any one of an effective current value of the first phase coil 1a, an effective current value of the second phase coil 1b and an effective current value of the third phase coil 1c may be inputted to the first temperature estimation section 10c as the post-transformation output signal, and may be used in estimation of the temperatures of the first phase coil 1a, the second phase coil 1b and the third phase coil 1c with the first temperature estimation section 10c.

In the example illustrated in FIG. 1 to which the motor temperature estimating device 100 according to the first embodiment is applied, the rotation angle of the polyphase motor 1 is detected by the rotation angle sensor 3, but in another example to which the motor temperature estimating device 100 according to the first embodiment s applied, the rotation angle of the actuator 50 (see FIG. 7) may be detected by the rotation angle sensor 3. When the polyphase motor 1 rotates, the actuator 50 operates. Thus, in this example, the determination section 10a (see FIG. 1) determines, based on the operation of the actuator 50, whether or not the polyphase motor 1 is rotating. Consequently, if, for example, the rotation angle sensor 3 is provided to detect the operation of the actuator 50, it can be determined whether or not the polyphase motor 1 is rotating without necessity to provide a rotation angle sensor that detects the rotation of the polyphase motor 1 separately.

In the example illustrated in FIG. 3 to which the motor temperature estimating device 100 according to the first embodiment is applied, the temperature of the first phase coil 1a is calculated (estimated) by adding up the ambient temperature of the polyphase motor I (see FIG. 1), which is detected by the ambient temperature sensor 4, and the amount of temperature rise of the first phase coil 1a (see FIG. 1), but in another example to which the motor temperature estimating device 100 according to the first embodiment is applied, the temperature of the first phase coil 1a may be calculated by setting the ambient temperature as a fixed value while omitting the ambient temperature sensor 4, and by adding up the ambient temperature of the fixed value and the amount of temperature rise of the first phase coil 1a, instead of the above.

In the example illustrated in FIG. 1 to which the motor temperature estimating device 100 according to the first embodiment is applied, the determination section 10a determines whether or not the polyphase motor (the three-phase motor) I is rotating, based on the output signal of the rotation angle sensor 3, but in another example to which the motor temperature estimating device 100 according to the first embodiment is applied, an angular velocity sensor (not illustrated) that detects an angular velocity of rotation of the polyphase motor 1 may be provided instead of the rotation angle sensor 3, and based on an output signal of the angular velocity sensor, the determination section 10a may determine whether or not the polyphase motor 1 is rotating.

Second Embodiment

Hereinafter, a second embodiment concerning the motor temperature estimating device of the present disclosure will be described.

The motor temperature estimating device 100 according to the second embodiment is configured to be substantially similar o the motor temperature estimating device 100 according to the first embodiment illustrated in FIG. 1 except for a point that will be described below. Consequently, according to the motor temperature estimating device 100 according to the second embodiment, a substantially similar effect to that of the motor temperature estimating device 100 according to the first embodiment described above can be provided except for a point that will be described below.

The motor temperature estimating device 100 according to the first embodiment does not carry out control that reduces the first phase current flowing in the first phase coil 1a (see FIG. 1), the second phase current flowing in the second phase coil 1b (see FIG. 1), and the third phase current flowing in the third phase coil 1c (see FIG. 1) during stop of the polyphase motor 1 (see FIG. 1), but the motor temperature estimating device 100 according to the second embodiment carries out the control that reduces the first phase current flowing in the first phase coil 1a, the second phase current flowing in the second phase coil 1b, and the third phase current flowing in the third phase coil 1c during stop of the polyphase motor 1, as will be described below.

In the motor temperature estimating device 100 according to the second embodiment, target currents of the first phase current, the second phase current and the third phase current are calculated by a target current arithmetic operation section 10e (see FIG. 1). Further, it is determined by a determination section 10f (see FIG. 1) whether or not to reduce the target currents that are calculated by the target current arithmetic operation section 10e.

The motor temperature estimating device 100 according to the second embodiment can be applied to the electric active stabilizer 150 (see FIG. 7) similarly to the motor temperature estimating device 100 according to the first embodiment.

When a vehicle that includes the electric active stabilizer 150 (see FIG. 7) to which the polyphase motor 1 (see FIG. 7) is applied continues a high load running such as a performance driving and a mountain-road running, the actuator 50 (see FIG. 7) that rotates by being driven by the polyphase motor 1 needs to continue to generate a large torque for a long time period, and the temperature of the coils of the polyphase motor 1 readily rise.

In the light of the above respect, in the example in which the motor temperature estimating device 100 according to the second embodiment is applied to the electric active stabilizer 150, the current flowing in the first phase coil 1a (see FIG. 1), the current flowing in the second phase coil 1b (see FIG. 1) and the current flowing in the third coil 1c (see FIG. 1) are reduced when the actuator 50 stops after continuing to generate a large torque for a long time period, for example.

Consequently, in the example in which the motor temperature estimating device 100 according to the second embodiment is applied to the electric active stabilizer 150, temperature rises of the first phase coil 1a, the second phase coil 1b and the third phase coil 1c of the polyphase motor 1 can be suppressed more than in an example where the first phase current flowing in the first phase coil 1a, the second phase current flowing in the second phase coil 1b and the third phase current flowing the third phase coil 1c are not reduced when the actuator 50 stops.

Further, when the polyphase motor 1 rotates, the actuator 50 operates. Thus, in the example in which the motor temperature estimating device 100 according to the second embodiment is applied to the electric active stabilizer 150, it is determined that the polyphase motor 1 remains stopped based on stop of the actuator 50.

Consequently, in the example in which the motor temperature estimating device 100 according to the second embodiment is applied to the electric active stabilizer 150, if, for example, the rotation angle sensor 3 (see FIGS. 1 and 7) for detecting the operation of the actuator 50 or an angular velocity sensor is provided, it can be determined that the polyphase motor 1 stops without necessity to provide a rotation angle sensor or the like that detects the rotation of the polyphase motor 1 separately.

More specifically, in the example in which the motor temperature estimating device 100 according to the second embodiment is applied to the electric active stabilizer 150, the speed reducer 51 (see FIG. 7) is interposed between the polyphase motor 1 and the actuator 50 (in detail, between the polyphase motor 1 and the left stabilizer bar 52L or the right stabilizer bar 52R), so that a stopped state (in detail, a stopped state of the right stabilizer bar 52R (see FIG. 7) with respect to the left stabilizer bar 52L (see FIG. 7)) of the actuator 50 (see FIG. 7) is kept even when the first phase current flowing in the first phase coil 1a (see FIG. 1), the second phase current flowing in the second phase coil 1b (see FIG. 1) and the third phase current flowing in the third phase coil 1c (see FIG. 1) of the polyphase motor 1 (see FIG. 7) are reduced.

Consequently, in the example in which the n temperature estimating device 100 according to the second embodiment is applied to the electric active stabilizer 150, the first phase current flowing in the first phase coil 1a, the second phase current flowing in the second phase coil 1b and the third phase current flowing in the third phase coil 1c are reduced, and the state where the rotor (not illustrated) of the polyphase motor 1 is stopped with respect to the stator (not illustrated) can be kept.

That is, in the example in which the motor temperature estimating device 100 according to the second embodiment is applied to the electric active stabilizer 150, the temperature rises of the first phase coil 1a, the second phase coil 1b and the third phase coil 1c of the polyphase motor 1 can he suppressed, and the state where the rotor of the polyphase motor 1 is stopped with respect to the stator can be kept.

Figure 9:
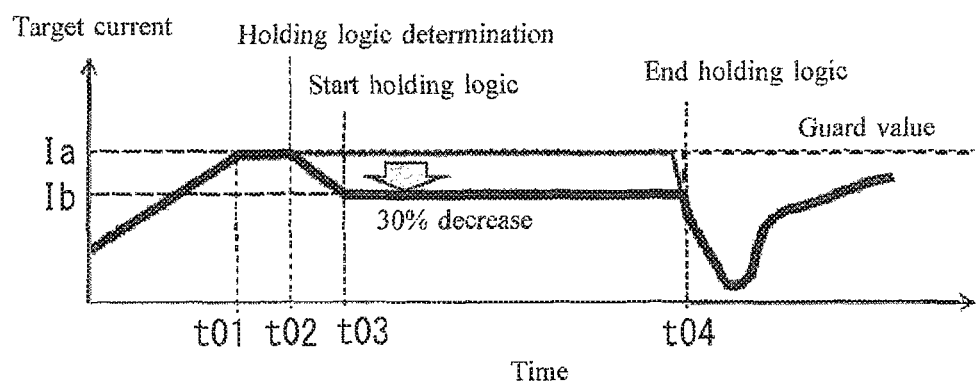
FIG. 9 is a time chart of a target current for, for example, the first phase coil in the example in which the motor temperature estimating device according to a second embodiment is applied to an electric active stabilizer.

FIG. 9 is a time chart of a target current for, for example, the first phase coil 1a in the example in which the motor temperature estimating device 100 according to the second embodiment is applied to the electric active stabilizer 150.

In the example illustrated in FIG. 9 in which the motor temperature estimating device 100 according to the second embodiment is applied to the electric active stabilizer 150, the target current for the first phase coil 1a (see FIG. 1) varies during rotation (before a time point t01) of the polyphase motor 1 (see FIG. 1). Next, at the time point t01, the target current for the first phase coil 1a is held and kept at a value Ia, and rotation of the polyphase motor 1 stops.

Next, in the example illustrated in FIG. 9 in which the motor temperature estimating device 100 according to the second embodiment is applied to the electric active stabilizer 150, at a time point t02, the determination section 10*f* (see FIG. 1) determines to reduce the target current for the first phase coil 1a, and in a time period from t02 to t03, the target current for the first phase coil 1a is reduced to a value Ib from the value Ia by the target current arithmetic operation section 10*e* (see FIG. 1). Next, at a time point t04, the state of the polyphase motor 1 is switched to a rotating state from the stopped state, and the target current for the first phase coil 1a starts to vary.

More specifically, in the example illustrated in FIG. 9 in which the motor temperature estimating device 100 according to the second embodiment is applied to the electric active stabilizer 150, the speed reducer 51 (see FIG. 7) is interposed between the polyphase motor 1 (see FIG. 7) and the actuator 50 (see FIG. 7) (in detail, between the polyphase motor 1 and the left stabilizer bar 521, (see FIG. 7) or the right stabilizer bar 52R (see FIG. 7)), and therefore, even if a load by a lateral acceleration of the vehicle is applied to the electric active stabilizer 150 in a time period from t03 to t04 in which the target current for the first phase coil 1a is reduced to the value Ib, the stopped state of the polyphase motor 1 can be kept.

In a third embodiment concerning the motor temperature estimating device of the present disclosure, the first and second embodiments and the respective examples concerning the motor temperature estimating device of the present disclosure described above can be properly combined.

What is claimed is:

1. A motor temperature estimating device comprising:
   a polyphase motor that includes a first phase coil, a second phase coil and a third phase coil;
   a first phase current sensor configured to detect a current flowing in the first phase coil, and output a first phase output signal;
   a second phase current sensor configured to detect a current flowing in the second phase coil, and output a second phase output signal;
   a third phase current sensor configured to detect a current flowing in the third phase coil, and output a third phase output signal; and
   an electronic control unit (ECU) configured to:
   determine whether or not the polyphase motor is rotating;
   transform the first phase output signal, the second phase output signal, and the third phase output signal to output a post-transformation output signal;
   estimate a temperature of the polyphase motor during rotation of the polyphase motor, based on the post-transformation output signal; and
   estimate a temperature of the polyphase motor during stoppage of the polyphase motor, based on the first phase output signal, the second phase output signal, and the third phase output signal.

2. The motor temperature estimating device according to claim 1,
   wherein the post-transformation output signal is any one of a current value of the first phase coil, a current value of the second phase coil, and a current value of the third phase coil.

3. The motor temperature estimating device according to claim 1, further comprising
   an actuator operatively connected to the polyphase motor, wherein the actuator is configured to rotate by being driven by the polyphase motor,
   wherein the ECU is configured to determine, based on an operation of the actuator, whether or not the polyphase motor is rotating.

4. The motor temperature estimating device according to claim 1, further comprising an operatively connected to the polyphase motor, wherein the actuator is configured to rotate by being driven by the polyphase motor,
   wherein when the actuator is stopped, the ECU controls the current flowing in the first phase coil, the current flowing in the second phase coil, and the current flowing in the third phase coil to be reduced, and the ECU is configured to determine that the polyphase motor is stopped.

5. The motor temperature estimating device according to claim 4,
   wherein a speed reducer is interposed between the polyphase motor and the actuator so that a stopped state of the actuator is kept even when the ECU controls the current flowing in the first phase coil, the current flowing in the second phase coil, and the current flowing in the third phase coil to be reduced.

6. The motor temperature estimating device according to claim 1, further comprising a storage, wherein the ECU is configured to calculate an amount of temperature rise of the first phase coil, based on the first phase output signal, an amount of temperature rise of the second phase coil, based on the second phase output signal, and an amount of temperature rise of the third phase coil, based on the third phase output signal, wherein the polyphase motor is applied to a vehicle that includes a power supply, and wherein the ECU controls the storage to store a largest value of the amount of temperature rise of the first phase coil, the amount of temperature rise of the second phase coil, and the amount of temperature rise of the third phase coil at a time of the power supply of the vehicle being turned off, and the largest value is used by the ECU to estimate a temperature of the polyphase motor at a time of the power supply of the vehicle being turned on next.

7. The motor temperature estimating device according to claim 1, further comprising a storage, wherein the ECU is configured to calculate an amount of temperature rise of the first phase coil, based on the first phase output signal, an amount of temperature rise of the second phase coil, based on the second phase output signal, and an amount of temperature rise of the third phase coil, based on the third phase output signal, wherein the polyphase motor is applied to a vehicle that includes a power supply, and wherein the ECU controls the storage to store a largest value and a second largest value of the amount of temperature rise of the first phase coil, the amount of temperature rise of the second phase coil, and the amount of temperature rise of the third phase coil at a time of the power supply of the vehicle being turned off, and either one of the largest value and the second largest value is used by the ECU to estimate a temperature of the polyphase motor at a time of the power supply of the vehicle being turned on next.

* * * * *